United States Patent [19]

Rak

[11] Patent Number: 5,239,285
[45] Date of Patent: Aug. 24, 1993

[54] LOW SALT LEVEL SENSOR

[75] Inventor: Stanley F. Rak, Mundelein, Ill.

[73] Assignee: Culligan International Company, Northbrook, Ill.

[21] Appl. No.: 586,290

[22] Filed: Sep. 21, 1990

[51] Int. Cl.$^5$ .................................. G08B 21/00
[52] U.S. Cl. ........................ 340/623; 340/612; 340/618; 73/305; 73/308; 116/228; 200/84 R; 200/84 C; 200/190; 137/397; 137/386
[58] Field of Search ............... 340/623, 624, 619, 618, 340/612; 73/305, 306, 307, 308; 116/227, 228; 200/84 R, 190, 84 C; 137/395-399, 386

[56] References Cited

U.S. PATENT DOCUMENTS

| | | | |
|---|---|---|---|
| 3,849,771 | 11/1974 | Applin | 340/624 |
| 4,038,650 | 7/1977 | Evans et al. | 340/619 |
| 4,440,022 | 4/1984 | Masom | 340/619 |
| 4,804,944 | 2/1989 | Golladay et al. | 340/624 |
| 4,987,409 | 1/1991 | Jackson | 340/623 |

*Primary Examiner*—Donnie L. Crosland
*Attorney, Agent, or Firm*—Gerstman & Ellis, Ltd.

[57] ABSTRACT

A low salt level sensor comprising a float within a brine tank, apparatus for detecting whether the float has risen in response to the addition of a predetermined amount of water to the brine tank to a height such that an adequate supply of salt is present in said brine tank and apparatus for indicating if the float has not risen high enough. A method of detecting whether the salt level is low in the brine tank of a water treatment system is also described. According to this method, brine is removed from the brine tank and a predetermined amount of water is added. A determination is then made as to whether the brine level has reached a height such that an adequate supply of salt is present in the brine tank and an indication is provided if the brine level is below this height.

4 Claims, 7 Drawing Sheets

LOW SALT LEVEL SENSOR

FIELD OF THE INVENTION

The present invention concerns a novel low salt level sensor. The illustrative embodiment is a low salt level sensor for use in water treatment systems.

BACKGROUND OF THE INVENTION

This invention relates to an improvement to water treatment systems, especially, what are commonly referred to as water softening systems. Water hardness refers to the presence of polyvalent cations such as calcium and magnesium cations in water. Water is softened by removing these cations.

Water softening occurs by running water through an ion exchange resin. The ion exchange resin replaces the calcium and magnesium cations in the water with sodium cations. As the ion exchange resin gives up its sodium cations and becomes loaded with calcium and magnesium cations, it eventually loses its capacity to soften water and the ion exchange resin must be replenished with sodium cations. The process by which the capacity of the ion exchange resin to soften water is restored and the sodium ions are replenished is referred to as regeneration.

In regeneration, brine, a concentrated or saturated salt solution, is passed through the ion exchange resin and the cations in the ion exchange resin are replaced with sodium ions. In this way, the relatively expensive ion exchange resin may be used repeatedly in the softening process.

The conventional water softening system includes a brine tank which serves as a source of brine. Brine is produced by adding water to the brine tank which contains a salt. The brine is then removed and used to regenerate the ion exchange resin.

As the salt is consumed during this process, it is necessary that salt be periodically added to the brine tank. This invention provides a device and method for alerting the operator of the water treatment system when salt should be added.

Most modern systems do not include a low salt level sensor. The operator must remember to periodically check the level of salt in the brine tank and add salt as needed. These systems are susceptible to operator forgetfulness and error and thus are not entirely satisfactory. As the salt is necessary for the proper functioning of the system and adding salt is the only regular maintenance most modern systems need, this invention will help eliminate or dramatically reduce failure of the system due to operator error.

Previous attempts to incorporate a low salt level sensor were not satisfactory. A weight was used in an attempt to determine the level of solid salt in the brine tank. The weight was supposed to sit on top of the solid salt at the bottom of the tank. One of the problems with sensors of this type is that, when operators would add salt to the brine tank, salt would be poured over the weight and it would be buried and be unable to rise and sense the correct salt level. As a result, the sensing unit would falsely indicate that salt was needed. In addition, the salt level did not drop in a uniform manner and the salt would become unevenly distributed and the sensing device would falsely indicate that salt was needed when an adequate supply was present.

The present invention avoids these problems by placing the level sensing device within the brine tank in an area where, under normal operating conditions, it should only be in contact with the liquid brine solution.

An object of the present invention is to provide a low salt level sensor which will alert the operator when salt is needed automatically.

Another object of the present invention is to provide a low salt level sensor that is easy and economical to construct and is simple in operation.

Other objects and advantages of the present invention will become apparent as the description proceeds.

SUMMARY OF THE INVENTION

In accordance with the present invention, a low salt level sensor is provided for use in the brine tank of a water treatment system. The low salt level sensor comprises a float within the brine tank, means for detecting whether said float has risen in response to the addition of a predetermined amount of water to said brine tank to a height such that an adequate supply of salt is present in said brine tank and means for indicating if the float has not risen high enough.

In accordance with the method of the present invention, a method of detecting whether the salt level is low in the brine tank of a water treatment system is also described. According to this method, brine is removed from the brine tank and a predetermined amount of water is added. A determination is then made as to whether the brine level has reached a height such that an adequate supply of salt is present in said brine tank and an indication is provided if the brine level is below this height.

The low salt level sensor and method provide notice to the operator of the water treatment system when the salt level in the brine tank is low and salt should be added. In addition, the low salt level sensor could automatically alert an operator at a remote location or a supplier of salt via telephone or radio.

DETAILED DESCRIPTION OF THE ILLUSTRATIVE EMBODIMENTS

Figure 1:
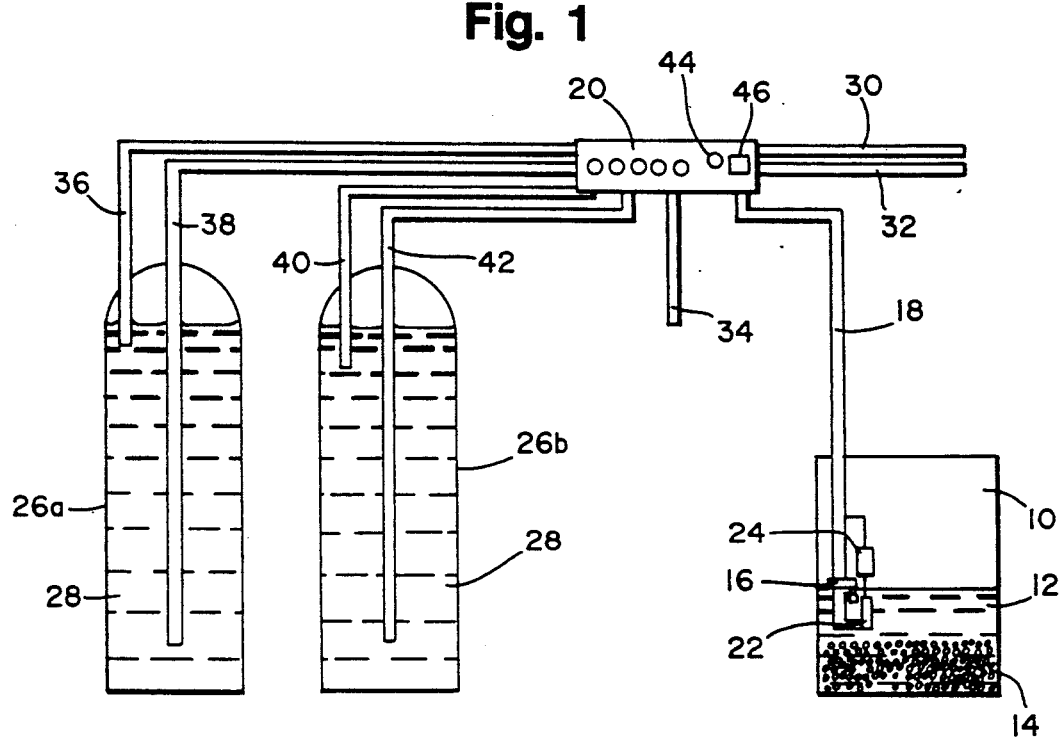
FIG. 1 is a stylized diagram of a water treatment system constructed in accordance with the principles of the present invention.

Ion exchange water treatment systems normally comprise one or more treatment tanks containing ion exchange resin and through which water is passed to treat it. They also comprise a brine tank which is connected to the treatment tanks through valves and pipe or tubing. Modern water softening systems also comprise electronic control apparatus which include a microprocessor.

The low salt level sensor and method for detecting low salt levels will be described primarily in use with such modern water treatment systems which include a microprocessor. It should be appreciated, however, that the microprocessor is not a part of this invention and the sensor and method of this invention can be used quite advantageously in less sophisticated systems.

Water and salt are mixed in the brine tank to form brine. The brine tank serves as a storage site for brine until it is needed for the regeneration of the ion exchange medium in the treatment tanks. It also serves as a storage site for the salt used to generate brine. The low salt level sensor comprises a float within said brine tank. The float should be made of a material which floats in brine and water. It can comprise any material or combination of materials which has a density less than that of brine or water and which resist corrosion and which will not absorb water, salt or brine, such as, for example, foamed polystyrene. Preferably, the float is mounted on a vertical shaft which passes axially through the center of the float.

The low salt level sensor further comprises detecting means for determining whether the float has risen in response to the addition of a predetermined amount of water to a height that indicates that there is sufficient salt in the tank to ensure that an adequate brine can be formed. Among the many means which could be used are an arm attached to the float which throws a switch when the float rises sufficiently or a cable or string attached to the float and a switch. The means could also be a photoelectric switch mounted in such a manner to detect whether the float has risen sufficiently. Preferably, the means comprises a magnet mounted axially within the float and a magnetic proximity reed switch within the shaft on which the float is mounted or a Hall effect switch.

The low salt level sensor further comprises means for indicating if said float has not risen to said height. Preferably, the means comprises an alarm which is activated if the float has not risen to a height that indicates that there is sufficient salt in the tank to ensure that an adequate brine can be formed. The alarm can be visual, audible or both. Most preferably, the sensor comprises a constant or flashing light or visual display and an intermittent audible alarm which can at the option of the operator be disabled.

The indicating means in the form of a visual and audible alarm may be mounted on the control apparatus, but need not necessarily be. If the water treatment system is in an inconvenient location or one not frequently visited, the indicating means could be placed at a location remote from the water treatment system such as a maintenance office or control room. The indicating means could also comprise a system for automatically alerting an operator or salt supplier by telephone or radio.

The method of detecting a low salt level comprises removing the brine from the brine tank. This is normally done so that the brine may be used to regenerate the ion exchange resin in the treatment tank. After the brine is removed, a predetermined amount of water is added to the brine tank. Next, a determination is made as to whether the liquid level in the brine tank has reached a height such that a sufficient volume of salt is present in the tank to form an adequate brine. If the liquid level is not high enough, an indication is given.

The present invention determines whether an adequate volume of salt is present using a liquid displacement method. A predetermined volume of liquid water is added to the brine tank and a determination is made whether the combined volumes of the liquid water and solid salt are sufficient to indicate that an adequate salt supply is present. It is important that the liquid level be measured immediately or shortly after the fixed volume of water is added to the brine tank, because the liquid level in the brine tank may change over time.

Figure 3:
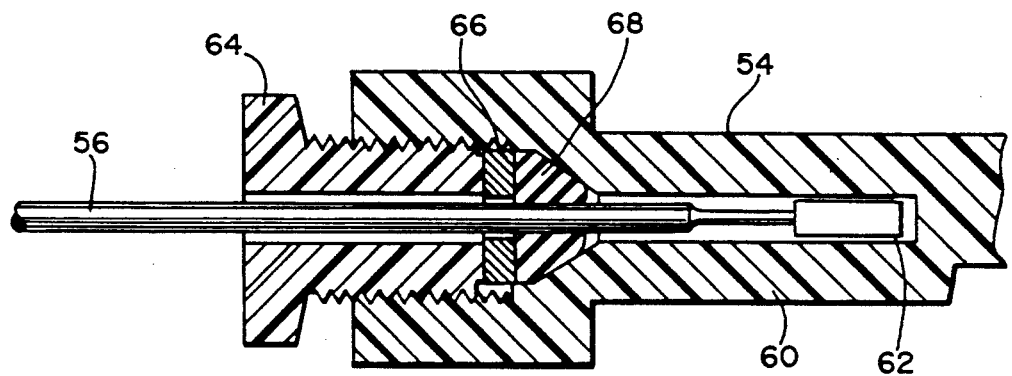
FIG. 3 is a cross sectional view of the Hall effect switch of FIG. 2.
Figure 2:
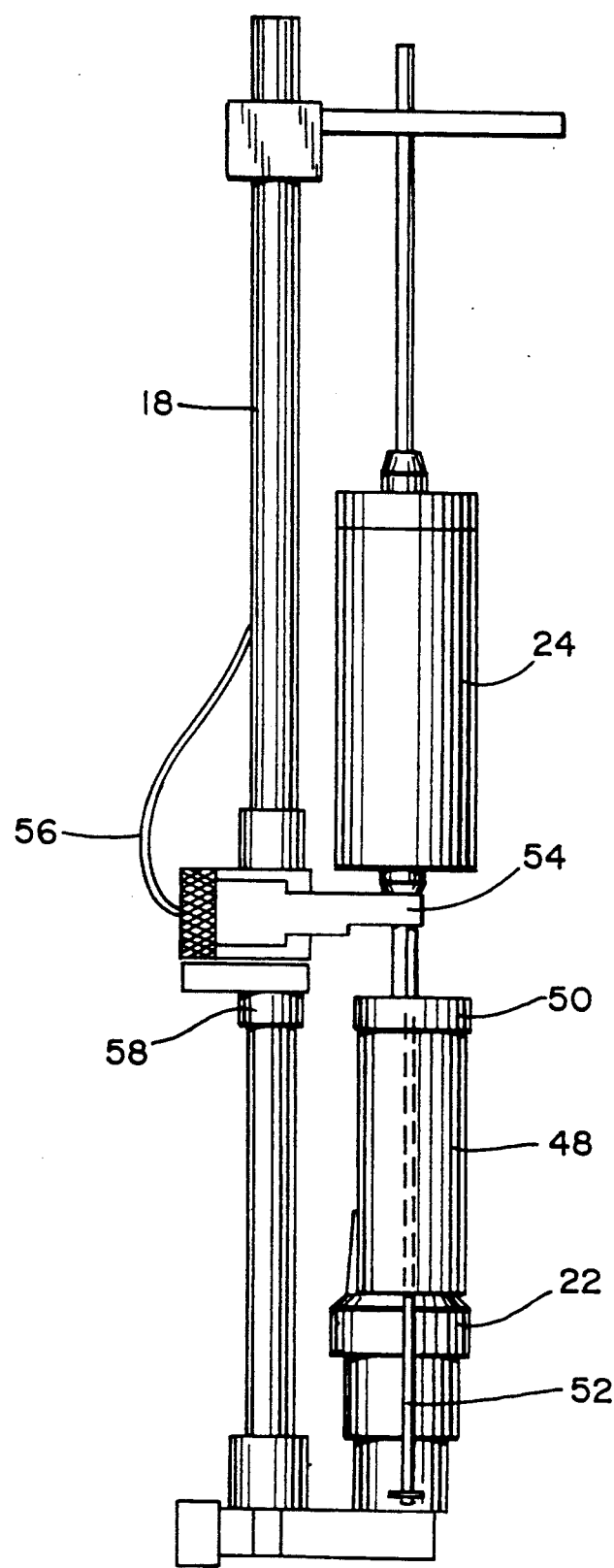
FIG. 2 is an illustration of a float and Hall effect switch used with an illustrative embodiment.
Figure 4:
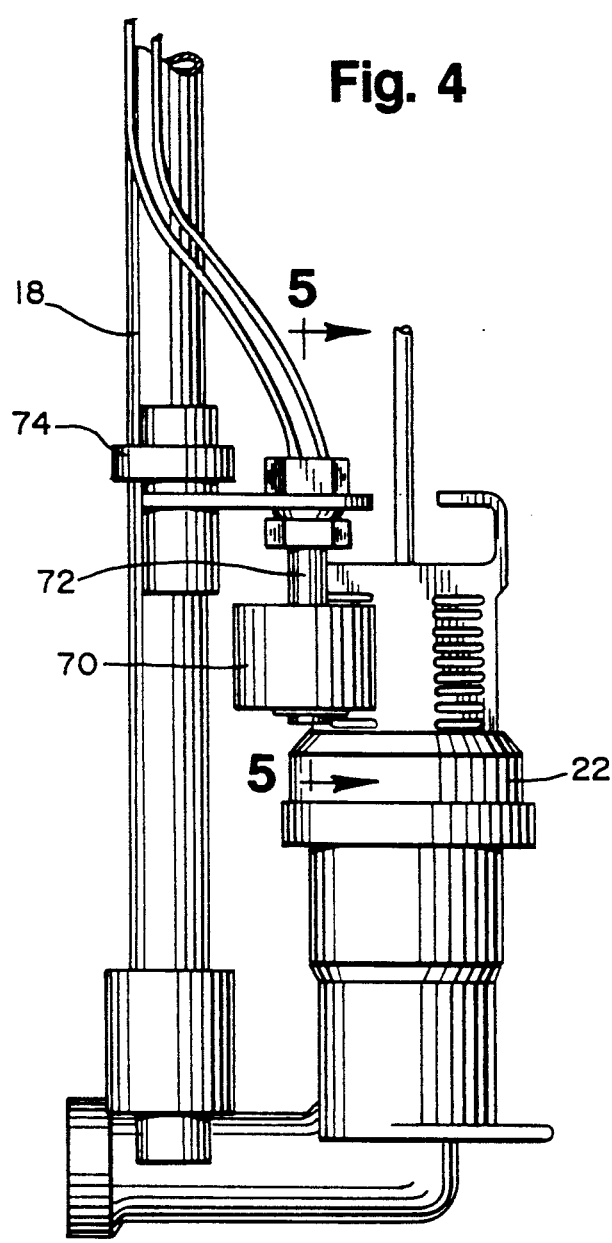
FIG. 4 is an illustration of a float and reed switch used with an illustrative embodiment.

Referring to the drawings, FIG. 1 is a diagram of a water treatment system. The brine tank 10 holds brine 12 and salt granules 14. The liquid level sensing apparatus 16, which will be described more fully in connection with FIGS. 2-4, is mounted in the brine tank 10 on conduit 18 connecting the brine tank 10 with the control apparatus 20. Conduit 10 may be used both to place water in the brine tank 10 and withdraw brine 12 from the brine tank 10 through brine valve 22. Brine valve safety float 24 rises and closes brine valve 22 if the liquid level in the brine tank exceeds the normal operating level.

Treatment tanks 26a and 26b contain ion exchange resin 28. Two treatment tanks are preferred so that while the ion exchange resin in one tank is being regenerated the other tank will be available to treat water. In this way, the supply of treated water will not be interrupted.

The control apparatus 20 is connected by conduit 30 to a source of untreated supply water. Conduit 32 is for treated water and conduit 34 is a drain to the sewer. The control apparatus 20 is connected to the brine tank 10 by conduit 18 and to treatment tank 26a by inflow conduit 36 and outflow conduit 38 and to treatment tank 26b by inflow conduit 40 and outflow conduit 42.

Control apparatus 20 includes low salt level alarms 44 and 46. Visual alarm 44 is a light and audible alarm 46 is a beeper or buzzer.

FIG. 2 is a illustration of one embodiment of the liquid sensing apparatus. The liquid sensing apparatus comprises float 48, magnet 50, shaft 52 (shown in partial cut-away) and Hall effect switch apparatus 54, which will be described in greater detail below in connection with FIG. 3. The Hall effect switch apparatus 54 is connected by wires 56 to control apparatus 20. The brine valve safety float 24 and brine valve 22 are shown in the background. The float 48 and magnet 50 are mounted on shaft 52 so that the float 48 and the magnet 50 are free to rise and fall with changes in the liquid level in the brine tank 10. The liquid sensing apparatus is shown mounted on conduit 18 using mounting apparatus 58.

FIG. 3 is a cross section of Hall effect switch apparatus 54 of FIG. 2. It comprises switch body 60 in which the other parts of the switch apparatus 54 are placed. A Hall effect switch 62 is mounted in the narrow distal end of switch body 60 and is connected by wires 56 to control apparatus 20. The Hall effect switch 62 and wires 56 are held in place within switch body 60 by threaded nut 64, stainless steel washer 66 and rubber washer 68.

FIG. 4 is an illustration of an alternative embodiment of the liquid sensing apparatus. In this embodiment, the liquid sensing apparatus comprises float 70 and a reed switch within the shaft 72 on which the float 70 is mounted. This embodiment of the liquid sensing apparatus is mounted on shaft 18 with mounting apparatus 74.

Figure 5:
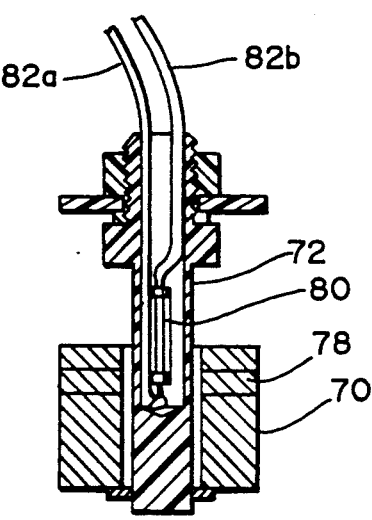
FIG. 5 is a cross sectional view of the float and reed switch of FIG. 4.

FIG. 5 is a cross section of the float 70 and shaft 72 taken along the plane of line 5—5 of FIG. 4. A magnet 78 is placed inside float 70. Reed switch 80 is placed inside shaft 72. The reed switch 80 is connected to control apparatus 20 by wires 82a and 82b.

Figure 6:
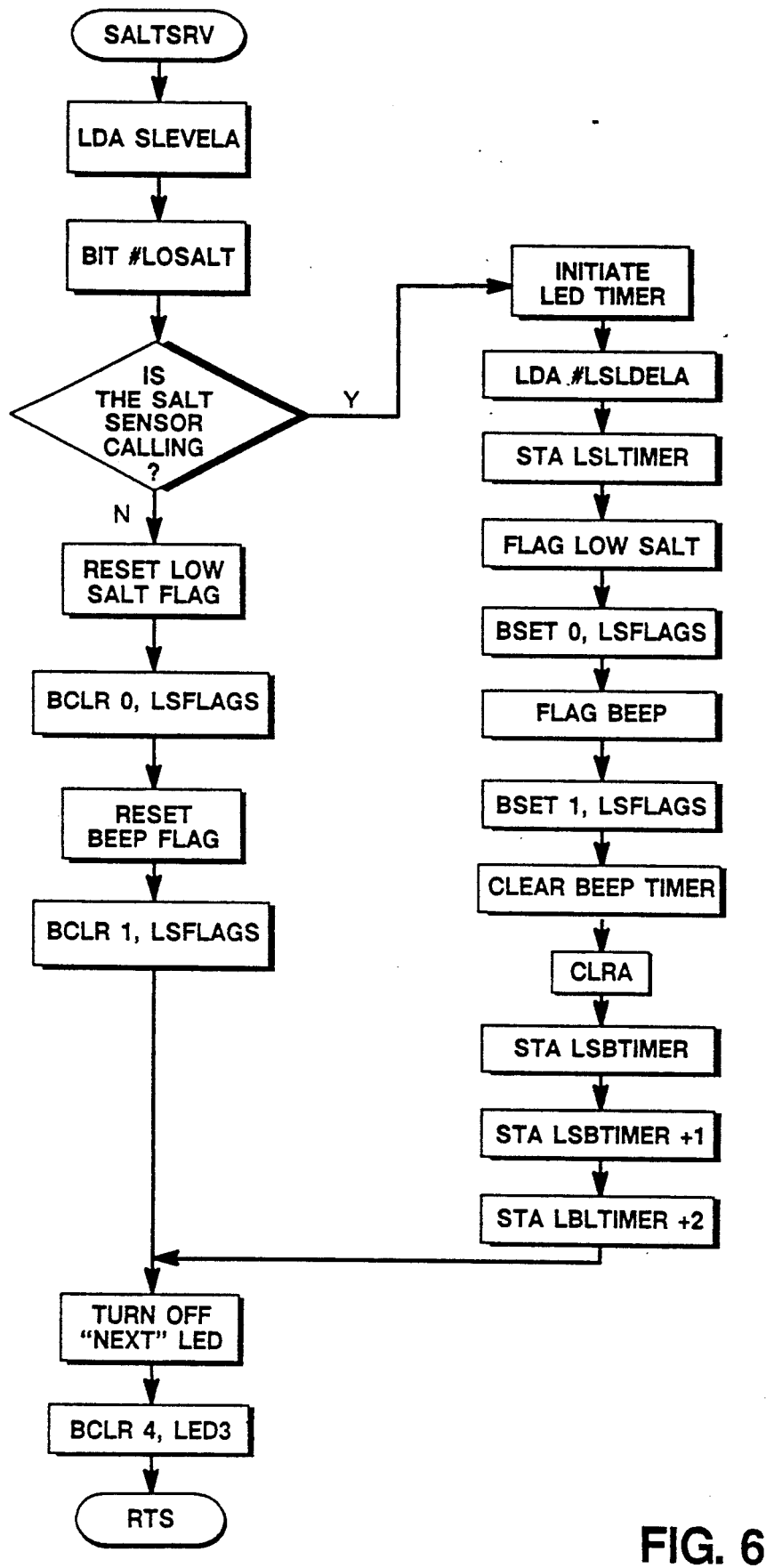
FIGS. 6–7, 8A, 8B are flow diagrams illustrating the operation of an embodiment of this invention.

FIGS. 6, 7, 8A, 8B are flow charts for the software of a microprocessor, showing one way in which the invention may be used advantageously with modern water treatment systems. FIG. 6 is a routine for reading the signal from the low salt sensor and signalling the user accordingly. In the routine of FIG. 6, the system first gets the salt sensor bit information. If the information indicates a low salt condition, a low salt LED is flashed and a beeper is sounded. If the information does not indicate a low salt condition, the low salt and beeper flags are reset for the next regeneration. In either case, after performing the above steps, a "Alarm Next Regen" LED is turned off. Thereafter, the system returns to the program step following the one from which the routine was called.

Figure 7:
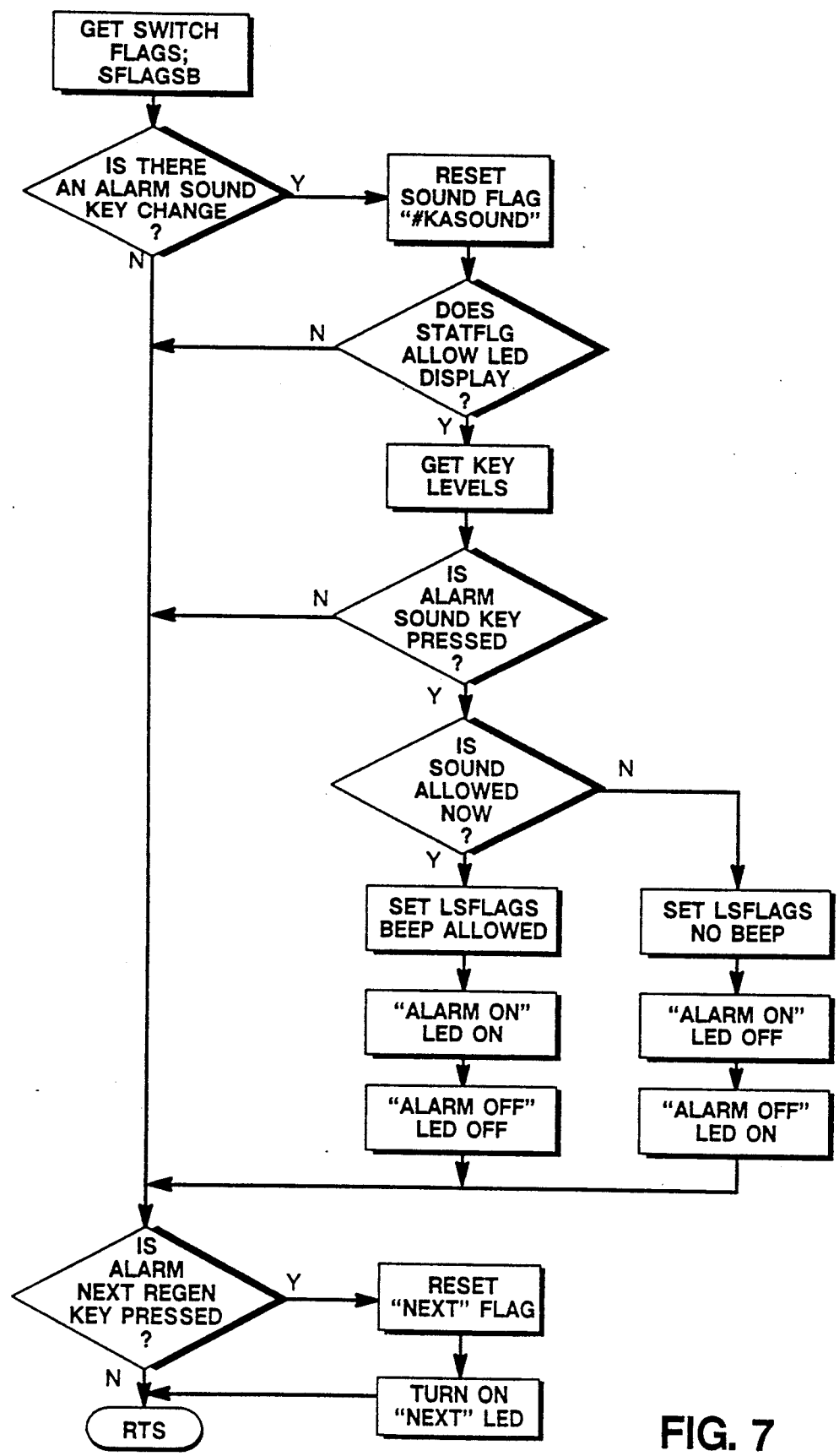

FIG. 7 is a routine for determining whether the audible alarm is activated or deactivated by the operator and operating the system accordingly. In FIG. 7, bit information from an "Alarm Sound" key is obtained. If the information has not changed, then the bit information from the "Alarm Next Regen" key is read. If this bit has not changed, then this routine is exited. If it has changed, then the "Next" flag is reset for the next regeneration, a "Next" LED is turned on and then this routine is exited. If the "Alarm Sound" bit information has changed, then the flag for the next regeneration is reset followed by looking at the "Status" key bit. If this bit does not allow for the display to go on, then go to the "Alarm Next Regen" sequence as above. If the "Status" bit allows for the display to go on, then the bit level for the "Alarm Sound" key is read. If the "Alarm Sound" key has not been pressed, then go to the "Alarm Next Regen" as above. If it has been pressed, then it must be determined if the "Alarm Sound" key has been changed to allow the alarm to sound now. If it has not, then set the flag to disable the alarm and light an "Off" LED and turn off the "On" LED. If it shows that the sound function has been allowed, then set the flag to enable the alarm and turn the "Off" LED off and an "On" LED on. Both cases are followed by going to the "Alarm Next Regen" routine as above.

Figure 8A:
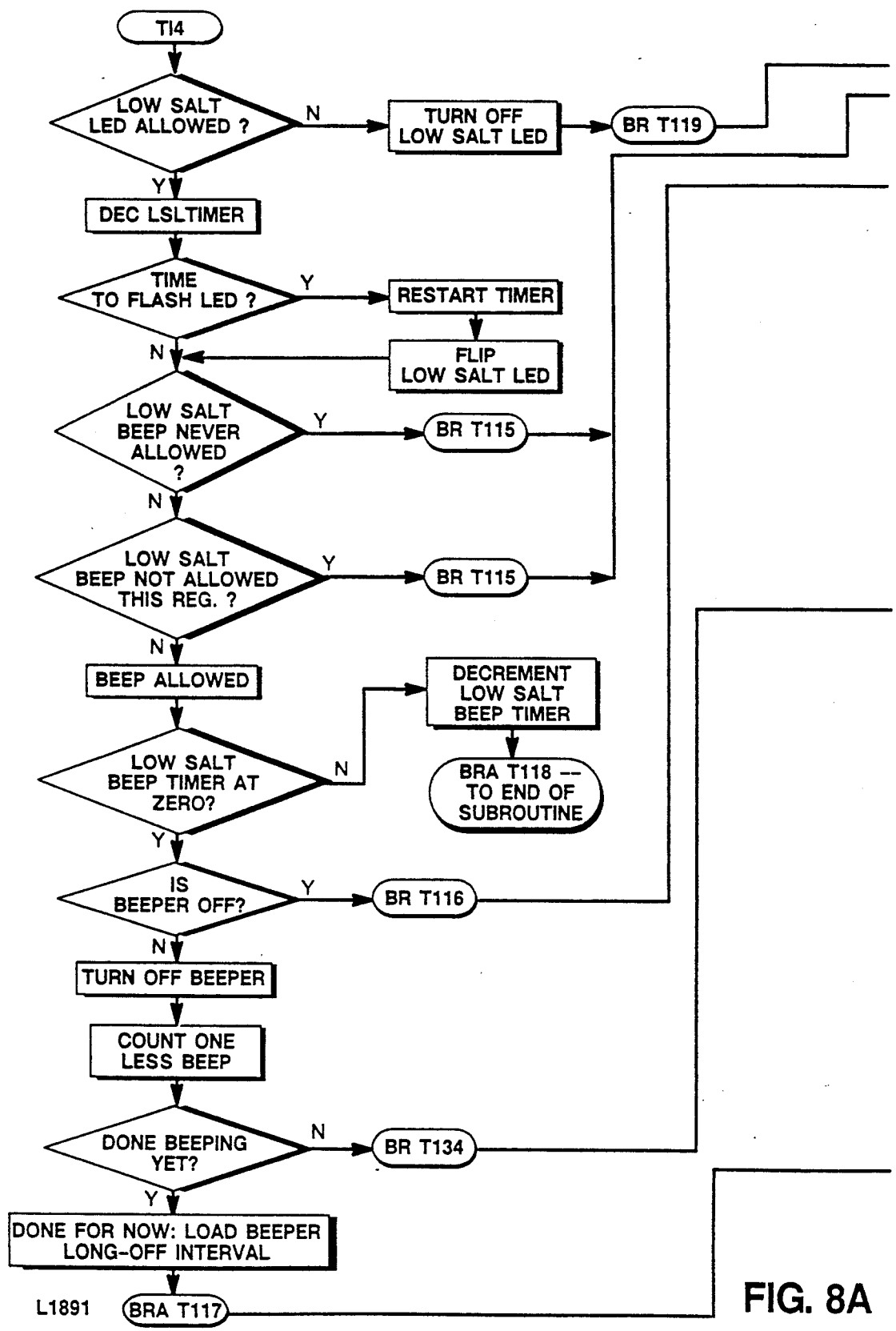
Figure 8:
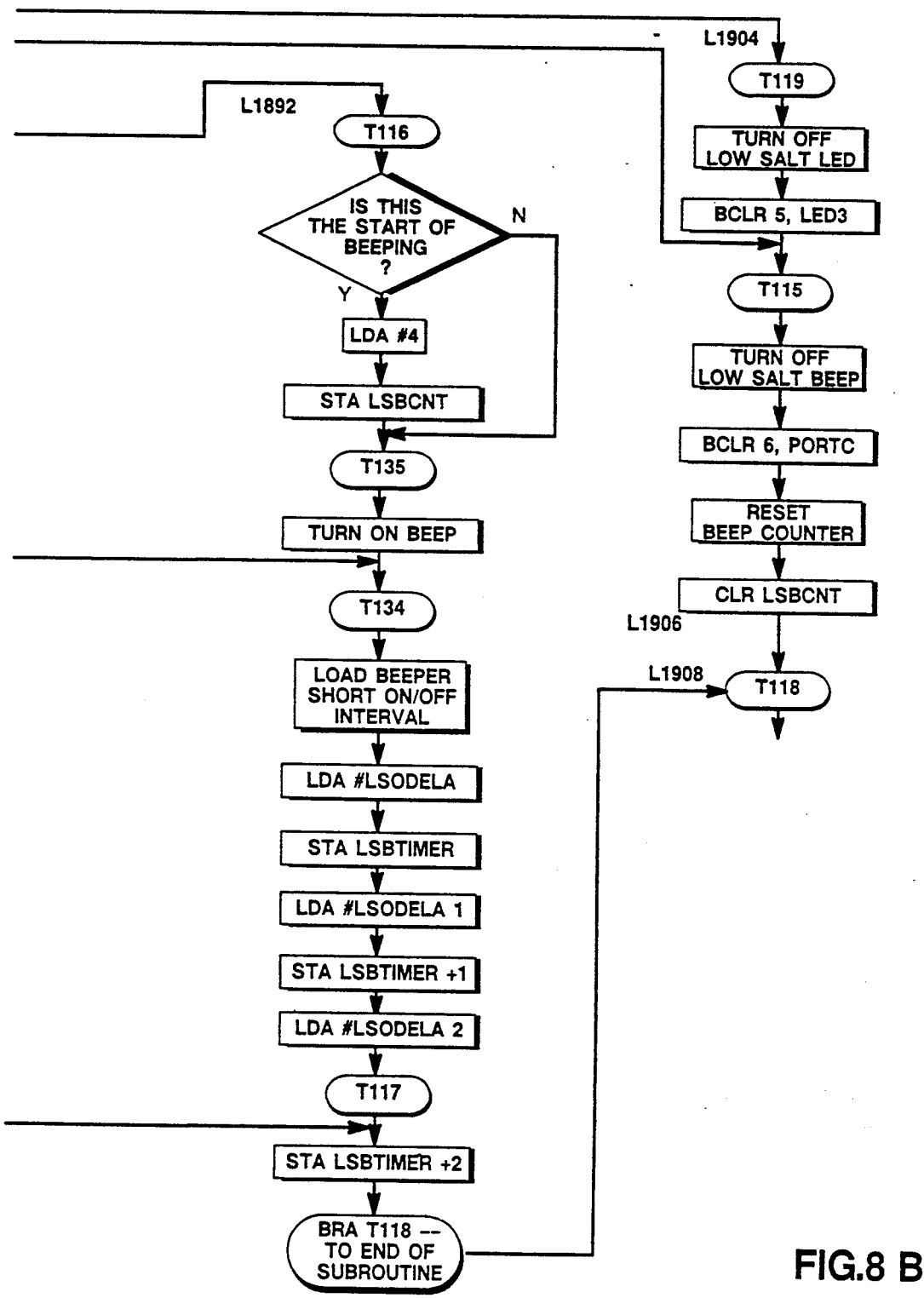

FIGS. 8A, 8B are a routines for controlling the operation of the visual and audible alarms. The first step in this routine is to determine whether the "Low Salt" LED is allowed or not. If it is not, then its register is cleared and it is turned off, followed by resetting the beep register to turn off the beeper and resetting the beeper counter. After this, exit the routine. If the "Low Salt" LED is allowed, then look at the LED control timer after decrementing it. This timer will show whether or not it is time to flash the LED. If it is, then restart the LED timer and turn on the LED and turn it off when the timer times out. If it is not time to flash the LED, then determine if the low salt beep is allowed. If the register indicates that the beep is not allowed, go to the routine which clears and resets the beeper control register and timer, then exit. If the beeper has not been disabled, determine if the beeper is allowed after the current regeneration. If it is not, reset the beeper register and exit as above. If it is allowed, load the beeper timer and check for it to time out. If the timer is not at zero, then go to a decrement routine. When the timer fully times out, the beeper turns off and exit the routine as above, If the timer has not fully decremented and the beeper has not gone off, turn it off. Clear its output register and decrement the beep counter by 1. If the beeper has not gone off, it has to be determined where in the beeper on/off cycle the machine is. If it is at the end with all timers and counters at zero, then go to the reload and exit instructions as above. If it is found that the beeper cycle is not done yet, then load the beeper off time into the proper register. Then reload the beeper timer and exit. If it is determined that the beeper has gone off, then it must be determined if this is the start of the beep on/off cycle. If it is, load the cycle counter and turn on the beeper. If it is not the start of the cycle, turn on the beeper. After this reload the beeper on/off cycle timer into the required location for the next regeneration and exit the routine.

Although illustrative embodiments of the invention have been shown and described, however, it is to be understood that various modifications and substitutions may be made by those skilled in the art without departing from the novel spirit and scope of the present invention.

What is claimed is:

1. A method of detecting low salt level in a brine tank of a water treatment system, said brine tank containing solid salt therein, said method comprising:
   removing brine from the brine tank;
   adding a predetermined volume of water to said brine tank, said volume of water being less than the tank volume but enough to completely submerge said solid salt;
   determining whether a magnet mounted on a float in said brine tank has reached a predetermined floating height such that an adequate supply of said salt is present in said brine tank; and
   indicating if the magnet is below said predetermined floating height.

2. The method of claim 1 in which the predetermined height of said float and magnet is detected by a Hall effect switch.

3. The method of claim 1 in which the predetermined height of said float and magnet is detected by a reed switch.

4. The method of claim 1 in which said indicating step is performed by a system comprising an audible/visual alarm.

* * * * *